United States Patent [19]

Torng

[11] Patent Number: 4,807,115
[45] Date of Patent: Feb. 21, 1989

[54] INSTRUCTION ISSUING MECHANISM FOR PROCESSORS WITH MULTIPLE FUNCTIONAL UNITS

[75] Inventor: Hwa C. Torng, Ithaca, N.Y.

[73] Assignee: Cornell Research Foundation, Inc., Ithica, N.Y.

[21] Appl. No.: 112,020

[22] Filed: Oct. 14, 1987

Related U.S. Application Data

[63] Continuation of Ser. No. 539,854, Oct. 7, 1983, abandoned.

[51] Int. Cl.[4] .............................................. G06F 13/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,297,999 | 1/1967 | Shimabukuro | 364/200 |
| 3,346,851 | 10/1967 | Thornton | 364/200 |
| 3,462,744 | 8/1969 | Tomasulo et al. | 364/200 |
| 3,718,912 | 2/1973 | Hasbrouck et al. | 364/200 |
| 3,962,706 | 6/1976 | Dennis | 364/900 |
| 4,050,058 | 9/1977 | Garlic | 364/200 |
| 4,128,880 | 12/1978 | Cray | 364/200 |
| 4,179,734 | 12/1979 | O'Leary | 364/200 |
| 4,197,589 | 4/1980 | Cornish | 364/900 |
| 4,466,061 | 8/1984 | De Santis | 364/200 |

OTHER PUBLICATIONS

R. M. Tomasulo, "An Efficient Algorithm for Exploiting Multiple Arithmetic Units", IBM Journal, Jan. 1967.
R. M. Keller, "Look-Ahead Processors", Computing Surveys, vol. 7, No. 4, Dec. 1975.
J. W. Bowra and H. C. Torng, "The Modeling and Design of Multiple Function-Unit Processors", IEEE Transactions on Computers, vol. C-25, No. 3, Mar. 1976.
Siewiorek, D. P. "Computer Structures: Principles and Examples", 1982, pp. 278, 288-292.
H. C. Torng et al., "An Instruction Issuing Approach to Enchancing Performance in Multiple Functional Units Processors", IEEE Transactions on Computers, vol. C-35, No. 9, Sep. 86.
J. E. Thornton, "Parallel Operation in the Control Data", A FIES Proceedings, vol. 26, pt. 2, 1964, pp. 489-496.
G. Bell et al., "The Cray-1 Computer System", Comm. of the ACM, vol. 21, No. 1, Jan. 1978.
V. P. Srinii and J. F. Asenjo, "Analysis of Cray-1S Architecture", ACM, 1983.

*Primary Examiner*—Raulfe B. Zache
*Assistant Examiner*—Florin Munteanu
*Attorney, Agent, or Firm*—Sughrue, Mion, Zinn, Macpeak & Seas

[57] ABSTRACT

An instruction issuing mechanism for boosting throughput of processors with multiple functional units. A Dispatch Stack (DS) and a Precedence Count Memory (PCM) are employed which allow multiple instructions to be issued per machine cycle. Additionally, instructions do no have to be issued according to their order in the instruction stream, so that non-sequential instruction issuance occurs. In this system, multiple instruction issuance and non-sequential instruction issuance policies enhance the throughput of processors with multiple functional units.

19 Claims, 1 Drawing Sheet

FIG.1A PRIOR ART
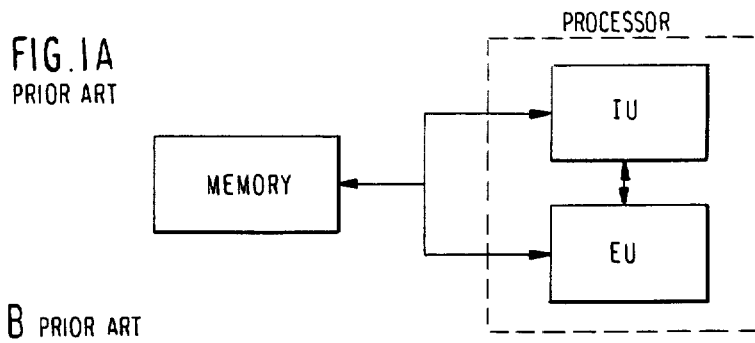
FIG.1B PRIOR ART
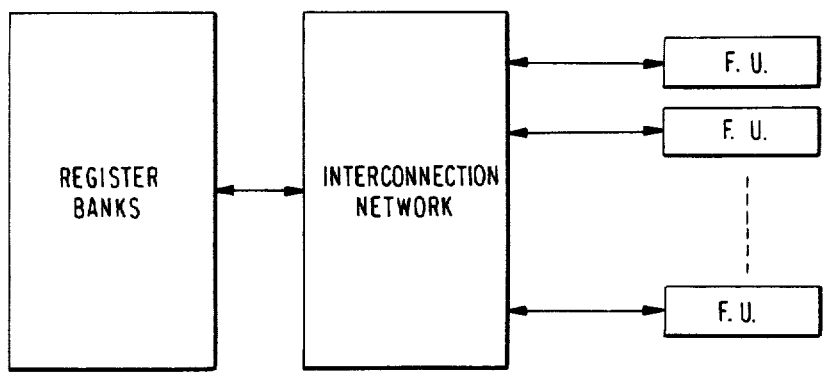
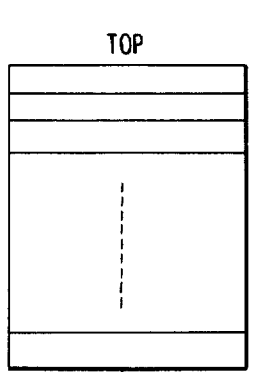
FIG.2A DISPATCH STACK
FIG.2B DISPATCH STACK
| TOP | | | | |
|---|---|---|---|---|
| I0, | AD, | F0, | F1, | F0 |
| I1, | AD, | F2, | F3, | F2 |
| I2, | AD, | F0, | F2, | F0 |
| I3, | AD, | F4, | F5, | F4 |
| I4, | AD, | F6, | F7, | F6 |
| I5, | AD, | F4, | F6, | F4 |
| I6, | AD, | F0, | F4, | F0 |
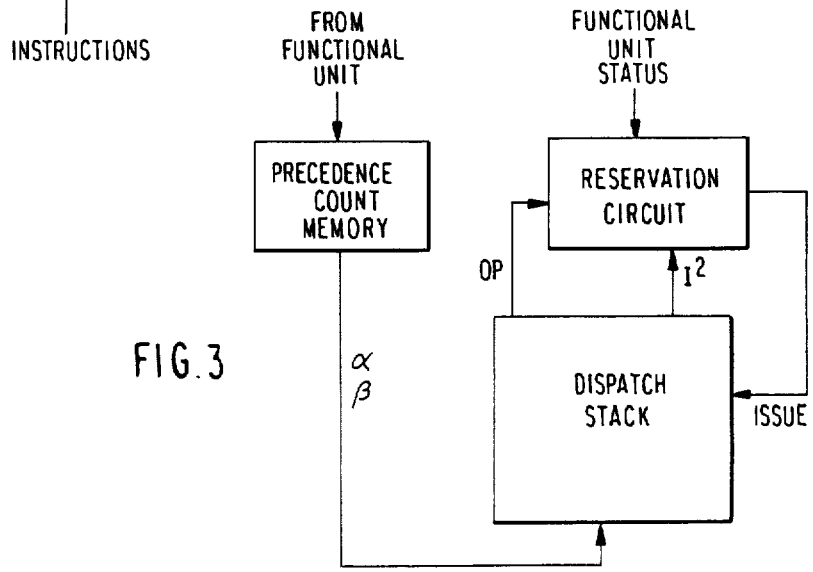
FIG.3

INSTRUCTION ISSUING MECHANISM FOR PROCESSORS WITH MULTIPLE FUNCTIONAL UNITS

This is a continuation of Ser. No. 539,854, filed on Oct. 7, 1983, now abandoned.

BACKGROUND OF THE INVENTION

This invention relates to computer architecture and specifically to an instruction issuing mechanism capable of detection of concurrencies in an instruction stream and issuing multiple instructions within a given machine cycle.

The emergence of VLSI technology has stimulated research into the use of execution structures employed by processors having multiple functional units. Such high performance processors are generally partitioned to two sections, an instruction unit (IU) and an execution unit (EU) such is illustrated in FIG. 1A. The IU and EU communicate with each other, with the IU fetching instructions from a memory and formulating and decoding those instructions. The IU is also employed to fetch operands if necessary. Additionally, the IU sends arithmetic/logic commands, that is, the decoded instructions together with a requisite operand to the EU. This invention relates specifically to an instruction issuing mechanism enhancing the throughput, that is, the number of instructions executed per unit of time of the EU.

Within the prior art, processors employing multiple functional units have been designed and implemented. Typical are the CRAY-1 and the IBM 360/91. Reference is made to, R.M. Russell, "The CRAY-1 Computer System" *A.C.M. Communications*, 21: 1, January, 1978, pp. 63-72, and to Srini et al, "Analysis of the CRAY-1S Architecture", *A.C.M.*, 10th *Symposium on Computer Architecture*, June, 1983, pp. 194-206. Reference is also made to R. M. Tomasulo, "An Efficient Algorithm for Exploiting Multiple Arithmetic Units", *IBM Journal*, 11: 1, January, 1967, pp. 25-33, for description of the IBM 360/91 system.

In accordance with such EU structure employing multiple functional units as shown in FIG. 1B, a bank of registers is installed in the EU to act as a bridge between the fast functional units (F.U.) and a slow main memory. The functional units in the EU perform arithmetic/logic operations on various data types, it being noted that the units are not necessarily identical. For example, reservations stations and a common data bus can also be incorporated. (R. M. Tomasulo, supra). Thus, some of the functional units may be virtual. The registers supply operands to the functional units and receive results from them while at the same time loading from and writing into the main memory.

The IU loads sequences of instructions into an instruction stack from which instructions are issued to and then executed by the functional units. Within prior art systems employing multiple functional units, at most one instruction is issued from the instruction stack during every machine cycle. As a result, the instructions execution rate of such an EU structure cannot be greater than the inverse of the machine cycle time (generally expressed in seconds). Reference is made to R. M. Keller, "Look-Ahead Processors", *Computing Surveys*, 7: 4, December, 1975, pp. 175-195, and J. W. Bowra, et al, "The Modeling and Design of Multiple Function Units Processors", *IEEE Transactions on Computers*, C25: 3, March, 1976, pp. 2102-2210. Specific reference is also made to Srini et al, supra, which indicates that the CRAY-1S system while well balanced suffers from a major drawback. The authors specifically note that the instruction issuing mechanism is a major bottleneck in the CRAY-1S architecture.

SUMMARY OF THE INVENTION

Given the deficiencies in prior art computer systems employing multiple functional units, it is an object of the present invention to define an instruction issuing mechanism which is capable of detecting concurrencies in an instruction stream and issuing multiple instructions within a given machine cycle and which may be extended to modify the instruction stream.

It is a further object of the invention to define an arithmetic engine implemented in a VLSI environment that substantially enhances the throughput of such a processor.

Yet another object of this invention is to formulate and define an instruction issuing mechanism for arithmetic engines utilizing multiple functional units to achieve high instruction execution rates.

A further object of this invention is to define a dispatch stack component of the instruction issuing mechanism operating in a FIFO mode and detecting instructions that can be issued at each machine cycle.

Still another object of this invention is to define a precedent count memory component of the instruction issuing mechanism to assign alpha- and beta-values for each instruction being loaded into the dispatch stack and to assign general purpose registers to operands to enhance possible execution concurrencies.

These and other objects of the present invention are achieved by an instruction issuing mechanism which detects concurrencies and issues multiple instructions within a given machine cycle. This invention will be described in greater detail by referring the attached drawings and the description of the preferred embodiment that follows.

BRIEF DESCRIPTION OF THE DRAWINGS

FIG. 1A is a schematic drawing of a black diagram of a processor partitioned into an instruction unit and an execution unit.

FIG. 1B is a schematic drawing of a block diagram of an arithmetic structure utilizing multiple functional units, illustrating the data flow section;

FIG. 2A is a schematic diagram showing the dispatch stack;

FIG. 2B is a schematic diagram illustrating the sequence of instructions deposited into the dispatch stack; and FIG. 3 is a block diagram of an instruction issuing mechanism in accordance with the present invention.

DESCRIPTION OF THE PREFERRED EMBODIMENT

Referring to FIGS. 1-3, the instruction format utilized by the present invention will be considered first. As noted herein, the processor is partitioned into two units, the instruction unit (IU) and the execution unit (EU). The IU fetches, formulates, decodes and then forwards arithmetic/logic instructions to the EU. A known format, employed in the CRAY-1 and other systems is as follows:

OP, S1, S2, D        (1)

where,

D denotes the register receiving the result of the arithmetic/logic operation;

S1 specifies the register which provides the first of two operands, or the only operand called for;

S2 specifies the register which yields the second of the two operands required; and OP denotes the arithmetic/logic operation to be performed. In this invention, we consider store register and load register as arithmetic/logic operations. As a result of this format, $$D \leftarrow [S1]OP[S2]. \quad (2)$$

If the registers D and S1 are identical, the instruction takes the same form as instructions for the execution units in the IBM 360/91.

The dispatch stack configuration in accordance with the present invention is shown in FIG. 2A. The IU formulates and forwards sequences of 3-register arithmetic/logic instructions as defined herein to the EU. That is, the instruction format utilizes registers D, S1 and S2. These sequences are deposited into a dispatch stack (DS) shown in FIG. 2A. The dispatch stack operates in a first-in first-out (FIFO) fashion. Each stack cell is implemented with a register.

In accordance with known FIFO processing, instructions in the format specified by (1) are sent by the IU to the bottom cell of the DS. This is indicated by the instruction arrow in FIG. 2A. Instructions are then advanced upward in the stack as instructions in an instruction stream are loaded in the DS from the bottom. As a result, when the DS is full in a steady state, the top cell always contains the instruction in the head of the instruction stream. This can be illustrated as follows:

$$S = a_0 + a_1 + a_2 + a_3 + a_4 + a_5 + a_6 + a_7 \quad (3).$$

The IU will then fetch operands $a_0$ - - -, $a_7$ and deposit them into registers F0, - - -, F7, respectively. Additionally, the IU will deposit the following sequence of instructions into the DS.

```
I0, AD, F0, F1, F0
I1, AD, F2, F3, F2
I2, AD, F0, F2, F0
I3, AD, F4, F5, F4
I4, AD, F6, F7, F6
I5, AD, F4, F6, F4
I6, AD, F0, F4, F0
``` where AD indicates an "ADD" operation. It is recognized that the instruction sequence set forth in (4) is merely representative of a number of evaluations for statement (3). The present invention detects and enables execution concurrencies which are inherent in a given statement.

In accordance with the present invention, the IU deposits the sequence of instructions set forth in (4) into an initially empty dispatch stack. Such is shown in FIG. 2B. An instruction tag field representing the left hand most column is added, it being noted that instruction I0 occupies the top cell of the DS with subsequent instructions following. The second column contains the OP field, the third column S1, the fourth column S2 and the extreme right hand most colum D. The DS strives to issue arithmetic/logic instructions to the functional units as fast and as many as possible. Such is inherent to take advantage of the presence of multiple functional units in this arithmetic engine. The issuance of such instructions is therefore stopped when one or more of the following three conditions prevail:

(a) the lack of the requisite functional unit;

(b) the lack of the requisite interconnection paths to transmit operand and/or result; and/or (c) data dependencies among instructions.

In known instruction issuing mechanisms, once an instruction is stopped for any of the three above cited reasons, the flow of subsequent instructions also stops. Thus, in existing instruction issuing mechanisms, the EU examines only the instruction at the head of the instruction stream. Consequently, at most only one instruction can be issued for each machine cycle. As noted, if the top instruction cannot be issued because of the existence of one of the three conditions as set forth above, the flow of the instruction stream is entirely stopped. This deficiency in the prior art tends to degrade the engine output as a consequence of under utilization of available resources, that is, the functional units and the interconnection paths. This deficiency can be illustrated by referring again to FIG. 2B.

With the reservation stations and a common data bus scheme (CDB) the IBM 360/91 utilizes a floating-point execution unit which will examine instruction I0 and dispatch it to one of its three virtual adders. In the next machine cycle, the floating-point execution unit examines and dispatches instruction I1 and in the third machine cycle instruction I2 is examined and dispatched. In accordance with this system, for three machine cycles the multiplier will not receive any instruction. Another cause, due to data dependencies, which produces under utilization of functional units will be presented later. This defect is also true with the CRAY-1 system. This defect results in a wasteful under utilization of the functional units which are available in a contemporary EU structure. The situation becomes exacerabated.in the context of VLSI devices due to the continuing decline of hardware cost. That is, since at most one instruction is issued for each machine cycle the instruction execution rate is locked by much less than the inverse of the machine cycle time.

The present invention departs significantly from such known systems by providing the dispatch stack (DS) with capabilities to allow it to examine and issue one or more instructions for each machine cycle. Thus, in accordance with the present invention, the dispatch stack identifies and issues instructions that can be immediately executed with available functional units. The technique of determining data dependencies will now be discussed in the context of the present invention.

An instruction in an instruction stream can be immediately issued to an available functional unit, real or virtual, if it does not have any data dependencies with those preceding instructions which have not yet been completed. For example, referring to FIG. 2B, instruction I2 is data dependent upon instruction I0. This occurs since one of the source registers of I2, F0 is the destination register of I0. Stated differently, I2 utilizes the result of I0 as an operand and therefore it must wait for the completion of instruction I0.

Consequently, it can be generalized that an instruction is data dependent upon a preceding, uncompleted instruction if one of its source registers is the destination register of the latter.

Referring again to FIG. 2B, it can be shown that instruction I2 is data dependent upon instruction I0 in a second sense. Specifically, the destination register of I2, F0, is one of the source registers of I0. Thus, if instruction I2 is issued and completed before I0, I0 may mistakenly utilize the result of I2 as one of its operands. Consequently, it may also be generalized that an instruction is data dependent upon a preceding, uncompleted instruction if its destination register is a source register of the latter.

These two generalizations allow enrichment of the entries in the dispatch stack. The resultant fields are given below:

$$\text{Instruction tag, OP, S1, } \alpha(S1), S2, \alpha(S2), D, \beta(D), I^2 \tag{5}$$

where $\alpha(Si)$ represents the number of times that a particular register Si is used as a destination register in preceding, uncompleted instructions;

$\beta(D)$ represents the number of times that register D is designated as a source register in preceding, uncompleted instructions; and $I^2$ represents the issue index field to be delineated herein.

The sequence of instructions entered into the dispatch stack DS, shown in FIG. 2B, is represented as follows:

CHART I

| Instruction Tag, | OP, | S1, | $\alpha$(S1), | S2, | $\alpha$(S2), | D, | $\beta$(D), | $I^2$ |
|---|---|---|---|---|---|---|---|---|
| I0 | AD | F0 | 0 | F1 | 0 | F0 | 0 | 0 |
| I1 | AD | F2 | 0 | F3 | 0 | F2 | 0 | 0 |
| I2 | AD | F0 | 1 | F2 | 1 | F0 | 1 | 3 |
| I3 | AD | F4 | 0 | F5 | 0 | F4 | 0 | 0 |
| I4 | AD | F6 | 0 | F7 | 0 | F6 | 0 | 0 |
| I5 | AD | F4 | 1 | F6 | 1 | F4 | 1 | 3 |
| I6 | AD | F0 | 2 | F4 | 2 | F0 | 2 | 6 |

As shown in CHART I, I0 is at the top of the stack. There is no preceding, uncompleted instruction. Consequently, $\alpha(F0) = \alpha(F1) = \beta(F0) = 0$. Instruction I1 has instruction I0 as a preceding, uncompleted instruction but, neither of the source registers associated with instruction I1, that is, registers F2 and F3 are used as the destination register by I0-$\alpha$(F2)=$\alpha$(F3)=0. Additionally, the destination register of instruction I1, register F2 is not employed as a source register by I0-$\beta$(F2)=0. One of the source registers of I2 is F0 which is used by I0 as the destination register. Thus, it can be established that $\alpha$(F0)=1. The other source register of I2 is register F2 which is the destination register of instruction I1. Consequently, $\alpha$(F2)=1. Other $\alpha$- and $\beta$-values can be similarly delineated from the sequence of instructions set forth herein above.

An execution structure having reservation stations in a common data bus, for example, found in the IBM system 360/91 will issue instruction I0 whose two $\alpha$-fields and the $\beta$-field are 0 indicating that there are no data discrepancies preceding uncompleted instructions. Instruction I0 can therefore be immediately executed. The same is also true relative to instruction I1. Instruction I2 is then issued but any of the following conditions will suffice to prevent it from being immediately executed;

(a) $\alpha$(F0)=1 where F0 is used as a destination register by a preceding uncompleted instruction, that is an operand and not yet ready;

(b) $\alpha$(F2)=1, same as above; and (c) $\beta$(F0)=1, where F0 is used as a source register by a preceding uncompleted instruction—the deposit of the result of instruction I2 may erase an operand needed by a preceding instruction.

Instruction I2 is assigned a reservation station corresponding to a virtual functional unit. Thus, this unit is wasted. To rectify this defect in accordance with the present invention, the Issue Index ($I^2$) for an instruction is as follows:

$$I^2 = \alpha(S1) + \alpha(S2) + \beta(D) \tag{6}$$

In order to issue instructions and make the instruction resources used more efficiently, the dispatch stack is scanned from top to bottom. When an instruction with an $I^2$ value of 0 is encountered the issuing mechanism reserves an appropriate functional unit if available and then issues the instruction to it. The implementation of this search and issue operation is in the form of a reservation circuit as shown functionally in FIG. 3.

Considering again CHART I representing the sequence of instructions with $\alpha$, $\beta$, and $I^2$ fields when loaded into the DS. Assume now that there are four functional units which are capable of performing the "ADD" operation and these units are initially free. The search and issue mechanism identifies and issues instructions I0, I1, I3 and I4 concurrently to the four free functional units. This follows the policy rationale set forth herein. It is noted that if the common data bus scheme of the prior art is employed, instructions I0, I1, I2, I3 would have to be issued to the four free functional units. Instruction I2 due to data dependencies indicated in the chart occupies a functional unit without actually being computed. Thus, the unit could be advantageously employed to actually compute I4.

At the completion of an issued instruction, its destination register F0 is used as a "key" to content address the (S1) and the (S2) fields of those instructions which follow it in the dispatch stack and to decrement the appropriate $\alpha$-values by 1.

Similarly its source registers are in turn used to content address the (D) fields of all subsequent instructions and decrement their values.

Illustrating the dispatch stack update process, is CHART II which follows showing that at the completion of the instruction I0 its destination register F0 is used to "content address" the S1 and S2 fields of all the instructions which follow I0 in the DS. The S1 fields of I2 and I6 match the F0 key and their corresponding $\alpha$(S1) fields are decremented by 1. At the same time, the source registers of I0, that are F0 and F1, are used to content address the D fields of all instructions which follow I0 in the DS. The D field of I2 and I6 match the F0 key and their corresponding $\beta$(D) fields are decremented by 1. Moreover, instruction I0 is removed from the DS and subsequent instructions are advanced, that is moved up. Those subsequent instructions and the instruction stream should be brought into occupy empty spaces at the bottom of DS thereby operating in a FIFO mode. Thus, after decrementation and shifting the following chart exists.

CHART II

| Instruction Tag, | OP, | S1, | $\alpha$(S1), | S2, | $\alpha$(S2), | D, | $\beta$(D), | I |
|---|---|---|---|---|---|---|---|---|
| I1 | AD | F2 | 0 | F3 | 0 | F2 | 0 | 0 |

-continued

CHART II

| Instruction Tag. | OP. | S1. | α(S1), | S2, | α(S2), | D, | β(D), | I |
|---|---|---|---|---|---|---|---|---|
| I2 | AD | F0 | 0 | F2 | 1 | F0 | 0 | 1 |
| I3 | AD | F4 | 0 | F5 | 0 | F4 | 0 | 0 |
| I4 | AD | F6 | 0 | F7 | 0 | F6 | 0 | 0 |
| I5 | AD | F4 | 1 | F6 | 1 | F4 | 1 | 3 |
| I6 | AD | F0 | 1 | F4 | 2 | F0 | 1 | 4 |

It will be recognized that similar and in some cases concurrent completions of I1, I3 and I4 will reduce the contents of the DS to that shown as follows:

CHART III

| Instruction Tag. | OP. | S1. | α(S1), | S2, | α(S2), | D, | β(D), | I |
|---|---|---|---|---|---|---|---|---|
| I2 | AD | F0 | 0 | F2 | 0 | F0 | 0 | 0 |
| I5 | AD | F4 | 0 | F6 | 0 | F4 | 0 | 0 |
| I6 | AD | F0 | 1 | F4 | 1 | F0 | 1 | 3 |

Empty spaces ready for subsequent instructions.

The contents of the DS after decrementations and shifts initiated by the completion of Instructions I0, I1, I3 and I4 is therefore illustrated by CHART III.

Instructions I2 and I5 can now be issued and their completion will reduce the $I^2$ value of I6 to 0.

Operating under the assumption that (1) the operands will be available at their designated registers and (2) adequate data paths are available to transmit operands and results, the issue and execution schedule of the sequence of instructions of FIG. 2B will then be:
 First-I0, I1, I3, I4
 Second-I2, I5
 Third-I6
This schedule which produces the shortest computation time would not be detected and followed if a prior art common data bus scheme is employed.

The identification of data dependencies among instructions utilized in the example shown relative to FIG. 2B excludes the following case:

$I_a$: $OP_a$, $S1_a$, $S2_a$, $D_a$
.
.
.
$OP_i$, $S1_i$, $S2_i$, $D_i$
.
.
.
$I_b$: $OP_b$, $S1_b$, $S2_b$, $D_b$ where
 $D_a = D_b$ and $D_a \neq S1_i$, $D_a \neq S2_i$ for all i.

The instruction $I_a$ as shown is obviously superfluous since its result is not utilized or needed in subsequent instructions. This case should therefore be excluded from the system compiler software. Should this not be feasible then erroneous consequences will arise if instruction $I_b$ is completed before instruction $I_a$. Nevertheless, this can be prevented by defining β(D) as the number of times that register D is designated as a source register and/or destination registers in preceding uncompleted instructions.

At the completion of an issued instruction, its destination register is used as a "key" to content address the S1, the S2 and the D fields of those instructions which follow it in the dispatch stack. The destination register is also used to decrement the appropriate α- and β-values by 1. Similarly, its source registers are used to content address the D fields of all subsequent instructions and decrement their β-values. Thus, following this methodology instruction $I_b$ will not be issued until the completion of $I_a$.

The precedence count memory (PCM) as shown in FIG. 3 will now be discussed. It has been set forth herein that the IU formulates sequences of 3-register instructions and loads them into the DS. This requires, for example, the assignment of appropriate registers to operands and results. It also requires the determination of α(S1), α(S2), and β(D) for each instruction formulated. These two tasks can be facilitated with the introduction of the precedence count memory (PCM) shown in FIG. 3. The PCM is implemented with a rank of registers, each register corresponding to a general purpose register in the execution unit. Each register has an entry in the PCM. The α-field indicates the number of times that a specific register has been used as a destination register by instructions already in the DS. The β-field denotes the number of times that a specific register has been used as a source register. For example, after seven instructions are loaded into the dispatch stack as shown in Chart I, the PCM will have the entries as depicted below in Chart IV.

CHART IV

| Register | α | β |
|---|---|---|
| F0 | 3 | 3 |
| F1 | 0 | 1 |
| F2 | 1 | 2 |
| F3 | 0 | 1 |
| F4 | 2 | 3 |
| F5 | 0 | 1 |
| F6 | 1 | 2 |

Chart IV is therefore a "snapshot" of the PCM immediately after the DS has been loaded in the manner identified in Chart I.

When an instruction is removed from the DS upon completion, the α-value of its destination register and the β-values of its source registers are each decremented by 1.

When a register is assigned to an instruction as a source register, its α-value in the PCM is used as α(S1) or a α(S2) and its β-value is incremented by 1. When a register is appropriated to an instruction as its destination register, its present β-value is used as the β(D) field and its α-value is incremented by 1.

Thus, in accordance with the present invention a unique instruction issuing mechanism has been defined for execution structures with multiple functional units. This mechanism is capable of detecting concurrencies and then issuing multiple instructions within a given machine cycle. As a result, throughput of such processors is substantially enhanced. While the invention has been defined relative to a preferred embodiment herein, it is apparent that modifications may be practiced without departing from the essential scope of this invention.

I claim:

1. An instruction issuing system for a processor including an execution unit having multiple functional units comprising:
 an instruction issuing unit receiving instructions from a memory, operating on instructions and forwarding instructions to said execution unit, said instruction issuing unit including means for detecting the existence of concurrencies in said instructions received from said memory; and said instruction issuing unit further including means for issuing multiple instructions and non-sequential instructions to said execution unit within a single processor cycle when a concurrency is detected by said means for detecting the existence of concurrencies in said instructions.

2. The instruction issuing system of claim 1 wherein said means for detecting the existence of concurrencies comprises a dispatch stack receiving instructions from saaid memory and operating in a first-in first-out manner, said dispatch stack receiving instructions having instruction fields of OP, S1, S2, D, where:

OP is the arithmetic/logic operation to be performed,

S1 specifies a register which provides the first of two or the only operand called for, S2 specifies a register yielding the second operand, and, D specifies a register receiving the result of the arithmetic/logic operation.

3. The instruction issuing system of claim 2, wherein said means for detecting the existence of concurrencies in said instruction issuing unit further comprises a precedent count memory, said precedent count memory providing fields of a first value ($\alpha$) to instruction fields S1 and S2 indicative of the number of times a register S1(S2) is used as destination register in preceding, uncompleted instructions and, a second value ($\beta$) to register field D indicative of the number of times that register D is designated as a source register in preceding, uncompleted instructions.

4. The instruction issuing system of claim 2 wherein said means for detecting the existence of concurrencies includes a precedent count memory for providing values to each instruction loaded into said dispatch stack indicative of the number of times a register for a particular field is designated as a source register in preceding, uncompleted instructions.

5. The instruction issuing system of claim 3 wherein said means for detecting the existence of concurrencies determines an issue index ($I^2$) for each instruction in said dispatch stack wherein: $I^2 = \alpha(S1) + \alpha(S2) + \beta(D)$ such that when an instruction having $I^2 = 0$ is encountered by said means for detecting the existence of concurrencies, said means for issuing multiple instructions reserves an available functional unit and issues said instruction to it.

6. A method of issuing instructions for a processor having multiple functional units comprising the steps of:

reading in and storing instructions from an instruction stream into a dispatch stack, said instructions having an instruction formate of OP, S1, S2, D, where:

OP is the arithmetic/logic operation to be performed;

S1 is the register which provides the first of two or the only operand called for;

S2 is the register yielding the second operand, and

D is the register receiving the result of the arithmetic/logic operation;

detecting the existence of concurrencies in instructions stored in said dispatch stack and;

issuing multiple instructions and non-sequential instructions within a given processor cycle when the existence of concurrencies is detected.

7. The method of claim 6 wherein said step of detecting further comprises the steps of;

determining the number of times that individual registers in said processor are used as destination registers in preceding, uncompleted instructions, determining the number of times the individual registers in said processor are used as source registers in preceding uncompleted instructions, and providing an indication of the determination in said instruction format for each instruction in said dispatch stack.

8. The method of claim 7 wherein said step of issuing multiple instructions further comprises the step of immediately issuing a first instruction from said dispatch stack to an available functional unit when said instruction does not have any data dependencies with preceding issued instructions which have not yet been completed.

9. The method of claim 8 wherein an instruction is data dependent upon a preceding, uncompleted instruction if one of its source registers is the destination register of the uncompleted instruction.

10. The method of claim 8 wherein an instruction is data dependent upon a preceding, uncompleted instruction if its destination register is a source register of the uncompleted instruction.

11. The method of claim 7 wherein said step of determining comprises providing first values ($\alpha$) to register fields S1(S2) indicative of the number of times register S1(S2) is used as destination registers in preceding, uncompleted instructions and a second value ($\beta$) to register field D indicative of the number of times that register D is designated as a source register in to preceding, uncompleted instructions.

12. The method of claim 11 further comprising the steps of content addressing the S1,S2 and D fields following the completion of an issued instruction and, appropriately decrementing the values of $\alpha$'s, the values of $\beta$'s and updating the dispatch stack by advancing subsequent instructions stored therein and adding new instructions from said instruction stream occupy empty portions at the bottom of said dispatch stack.

13. The method of claim 11 further comprising the steps of updating the values of $\alpha$ and $\beta$ such that when a register is assigned to an instruction as a source register its present $\alpha$ value is used as $\alpha(S1)$ or $\alpha(S2)$ and its $\beta$ value is incremented by 1 and, when a register is assigned to an instruction as its destination register, its present $\beta$ value is used as the $\beta(D)$ field and its $\alpha$-value is incremented by 1 and further when an issued instruction is completed the $\beta$ values of each of its source registers is decremented by 1 and the $\alpha$ value of its destination register is decremented by 1.

14. An instruction issuing system for a processor including an execution unit having multiple functional units comprising:

an instruction issuing unit receiving instructions from a memory, said instruction issuing unit operating on instructions and forwarding instructions to said execution unit, said instruction issuing unit including means for detecting the existence of a plurality of instructions received from said memory which are concurrently executable; and said instruction issuing unit further including means for issuing multiple instructions and non-sequential instructions to said execution unit within a single processor cycle when concurrently executable instructions are detected by said means for detecting the existence of concurrently executable instructions in said instructions.

15. A method of issuing instructions for a processor having an execution unit with multiple functional units comprising the steps of:
- reading in and storing instructions from an instruction stream into a dispatch stack;
- detecting the existence of plurality of instructions which are concurrently executable from those instructions stored in said dispatch stack; and
- issuing multiple instructions and non-sequential instructions within a given processor cycle when said plurality of concurrently executable instructions are detected.

16. The method of claim 15 wherein said step of detecting further comprises the steps of;
- determining the number of times that individual registers in said processor are used as destination registers in preceding, uncompleted instructions, determining the number of times the individual registers in said processor are used as source registers in preceding uncompleted instructions, and providing an indication of the determination in said instruction format for each instruction in said dispatch stack.

17. The method of claim 16 wherein said step of issuing multiple instructions further comprises the step of immediately issuing a first instruction from said dispatch stack to an available functional unit when said instruction does not have any data dependencies with preceding issued instructions which have not yet been completed.

18. The method of claim 15 wherein an instruction is data dependent upon a preceding, uncompleted instruction if one of its source registers is the destination register of the uncompleted instruction.

19. The method of claim 15 wherein an instruction is data dependent upon a preceding, uncompleted instruction if its destination register is a source register of the uncompleted instruction.

* * * * *